US012679454B2

(12) United States Patent　　(10) Patent No.:　US 12,679,454 B2
Meyer et al.　　　　　　　　　　　(45) Date of Patent:　　Jul. 14, 2026

(54) OPEN LOOP-STYLE RETURN FOR STEER-BY-WIRE (AND CLOSED-LOOP EPS) APPLICATIONS

(71) Applicant: Steering Solutions IP Holding Corporation, Saginaw, MI (US)

(72) Inventors: Jeffrey R. Meyer, Munger, MI (US); Joel E. Birsching, Vassar, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 145 days.

(21) Appl. No.: 18/668,405

(22) Filed: May 20, 2024

(65) Prior Publication Data

US 2024/0400132 A1　　Dec. 5, 2024

Related U.S. Application Data

(60) Provisional application No. 63/469,898, filed on May 31, 2023.

(51) Int. Cl.
B62D 6/00　　　　　(2006.01)
(52) U.S. Cl.
CPC ................................... B62D 6/008 (2013.01)
(58) Field of Classification Search
CPC ..... B62D 5/0463; B62D 6/008; B62D 5/0466
See application file for complete search history.

(56)　　　　　　References Cited

U.S. PATENT DOCUMENTS

| 5,719,766 | A | * | 2/1998 | Bolourchi | ............ B62D 5/0466 |
| | | | | | 701/42 |
| 6,367,576 | B1 | * | 4/2002 | Rodenas | .............. B62D 5/0466 |
| | | | | | 701/42 |
| 8,115,838 | B2 | * | 2/2012 | Tamaoki | ............... G06T 3/4007 |
| | | | | | 382/167 |
| 11,254,345 | B2 | * | 2/2022 | Zheng | .................... B62D 1/181 |
| 11,760,410 | B2 | * | 9/2023 | Leydier | ................ B62D 5/0421 |
| | | | | | 701/41 |
| 2017/0066472 | A1 | * | 3/2017 | Wang | .................... B62D 5/0463 |
| 2017/0066473 | A1 | * | 3/2017 | Yu | ............................. B62D 6/10 |
| 2020/0307687 | A1 | * | 10/2020 | Meyer | ....................... B62D 6/04 |
| 2021/0031827 | A1 | * | 2/2021 | Karve | ................... B62D 5/0472 |
| 2021/0354750 | A1 | * | 11/2021 | Kim | ........................ B62D 5/006 |
| 2022/0340197 | A1 | * | 10/2022 | Klotzbach | ............ B62D 5/0466 |
| 2023/0068424 | A1 | * | 3/2023 | Sun | ........................ B62D 5/0469 |
| 2023/0077259 | A1 | * | 3/2023 | Katzourakis | ........ B60W 60/001 |
| 2024/0246606 | A1 | * | 7/2024 | Lowrie | .................... B62D 6/10 |
| 2024/0317299 | A1 | * | 9/2024 | Park | ........................ B62D 6/008 |
| 2025/0065945 | A1 | * | 2/2025 | Meyer | ...................... B62D 6/00 |
| 2025/0074501 | A1 | * | 3/2025 | Beck | .................... B62D 5/0466 |
| 2025/0115290 | A1 | * | 4/2025 | Birsching | ............ B62D 5/0466 |

* cited by examiner

*Primary Examiner* — Carl C Staubach
(74) *Attorney, Agent, or Firm* — Dickinson Wright PLLC

(57)　　　　　　ABSTRACT
A method for augmenting a return velocity of a handwheel coupled to a steering system of a vehicle includes calculating return-to-center (RtC) torque for the handwheel based on a vehicle speed and a position of the handwheel, calculating a return load value for the handwheel based on the RtC torque, providing the return load value as an input to an effort function of the steering system, and augmenting, based on the return load value and using the steering system, a return velocity of the handwheel.

15 Claims, 5 Drawing Sheets

OPEN LOOP-STYLE RETURN FOR STEER-BY-WIRE (AND CLOSED-LOOP EPS) APPLICATIONS

CROSS-REFERENCE TO RELATED APPLICATIONS

This application claims the benefit of U.S. Provisional Application No. 63/469,898, filed on May 31, 2023. The entire disclosure of the application referenced above is incorporated herein by reference.

TECHNICAL FIELD

This disclosure relates control of steer-by-wire and closed-loop EPS systems and methods in vehicles.

BACKGROUND OF THE INVENTION

A vehicle, such as a car, truck, sport utility vehicle, crossover, minivan, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY OF THE INVENTION

This disclosure relates generally to control of steer-by-wire (SbW) and closed-loop EPS systems and methods.

Aspects of the disclosed embodiments include systems and methods for augmenting the return velocity of a handwheel coupled to a steering system of a vehicle by calculating return-to-center (RtC) torque for the handwheel based on a vehicle speed and a position of the handwheel, calculating a return load value for the handwheel based on the RtC torque, and providing the return load value as an input to the steering system's effort function.

In other aspects of the present disclosure, a system is configured to implement functions of the various methods described herein.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
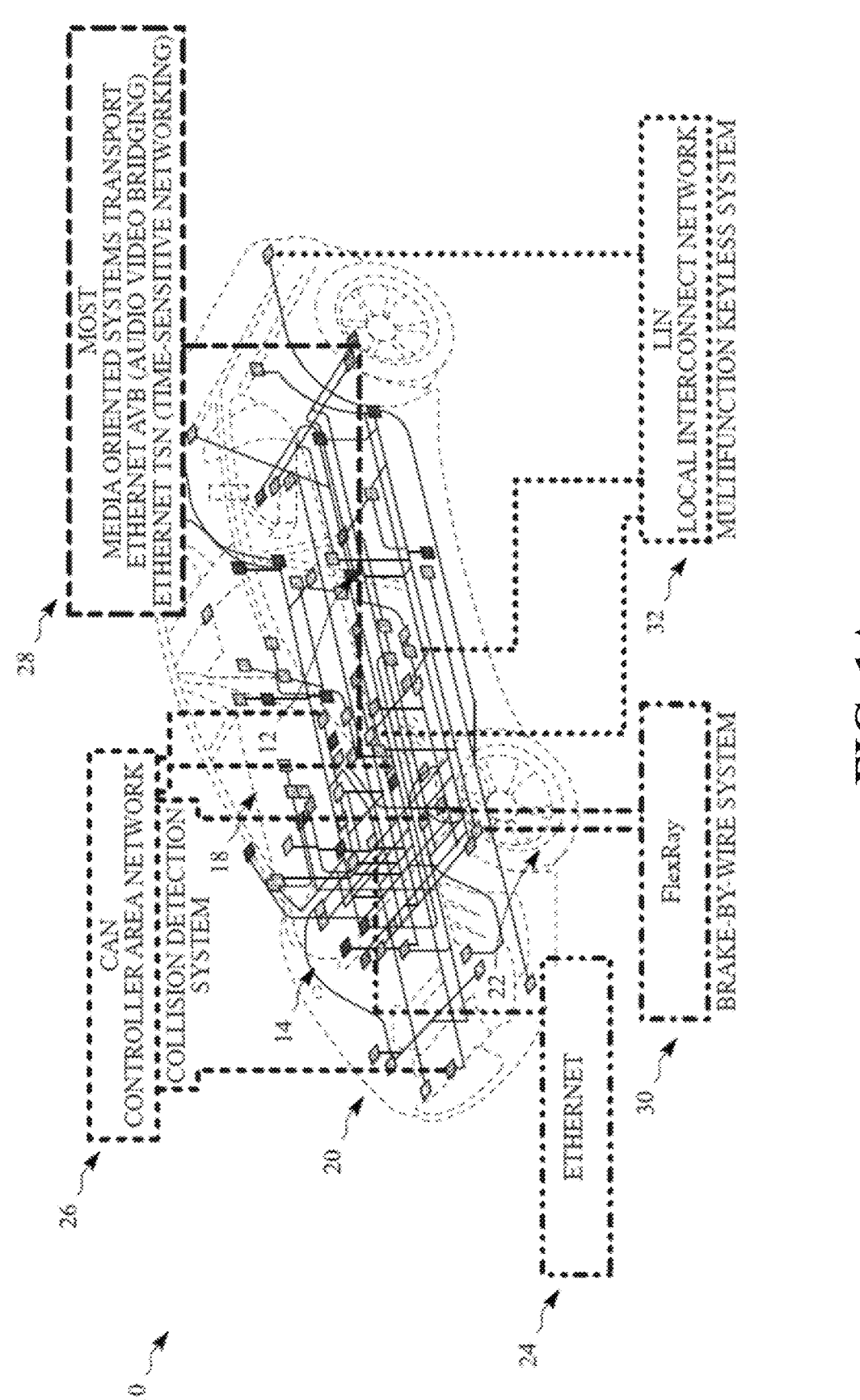
FIG. 1A generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, minivan, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

In some examples, EPS systems implement closed-loop torque control techniques. Closed-loop torque control systems may use controlled velocity return (CVR) techniques and methods to achieve a desired vehicle return-to-center performance. Systems that implement CVR techniques are configured to turn a handwheel of the vehicle to a center position at a defined and controlled rate, independent of any outside forces acting on the system. Consequently, steering systems that implement CVR techniques may be associated with an artificial feel (i.e., as perceived by a vehicle operator).

Conversely, open-loop return-to-center techniques provide a return-to-center torque based on an absolute position of the handwheel of the vehicle. Systems and methods according to the principles of the present disclosure are configured to implement open-loop torque control techniques for return-to-center functions in SbW and closed-loop EPS systems.

For example, a return-to-center (RtC) torque value is calculated based on a calibration table, dependent on vehicle speed and steering wheel position. The RtC torque value can then be scaled by handwheel torque (e.g., by applying a handwheel torque scalar) to improve steering feel when the driver is applying torque to the steering wheel. The handwheel torque scalar may be derived from a lookup table (e.g., a 2D lookup table) that correlates handwheel torque to a scaling factor and may vary with vehicle speed. This functionality is similar to typical open-loop EPS control.

A final return torque can then be converted to a rack load value (e.g., using a scalar value). The scalar value uses an instantaneous C-factor of the steering system to convert torque into a return load value. The return load value is provided to an effort function of a corresponding SbW or closed-loop EPS system. The effort function may output an effort value based on a lookup table or other function (e.g., by using an estimated rack load as an input). The estimated rack load may be modified prior to being input to the lookup table by adding the calculated return load value to the estimated rack load. While effort increases correspondingly, RtC speed will increase with hands off (or only lightly on) the steering wheel.

As used herein, an effort function defines a relationship between driver input (e.g., "effort," which may correspond to force or torque applied by the driver to the handwheel) and a response (i.e., movement) of the steering system. The effort function indicates an amount of effort required by the driver to cause a desired response.

Accordingly, as described above, RtC is calculated and applied as a modification to an existing effort function instead of using a separate closed-loop velocity return function within the SbW or closed-loop EPS logic.

FIG. 1A generally illustrates a vehicle 10 according to the principles of the present disclosure. The vehicle 10 may include any suitable vehicle, such as a car, a truck, a sport utility vehicle, a minivan, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive-by-wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media-oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steer-by-wire steering system (e.g., which may include or communicate with one or more controllers that control components of the steering system without the use of mechanical connection between the handwheel and road wheels 22 of the vehicle 10), a hydraulic steering system (e.g., which may include a magnetic actuator incorporated into a valve assembly of the hydraulic steering system), or other suitable steering system.

The steering system may include an open-loop control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10. In some examples, the steering system includes an EPS gear configured to provide steering assist functions. As used herein, "EPS gear" may refer to an EPS gear assembly including, for example, a motor, a gear reducer, and a controller or control circuitry. The steering system may be configured to implement RtC systems and methods according to the principles of the present disclosure.

Figure 1B:
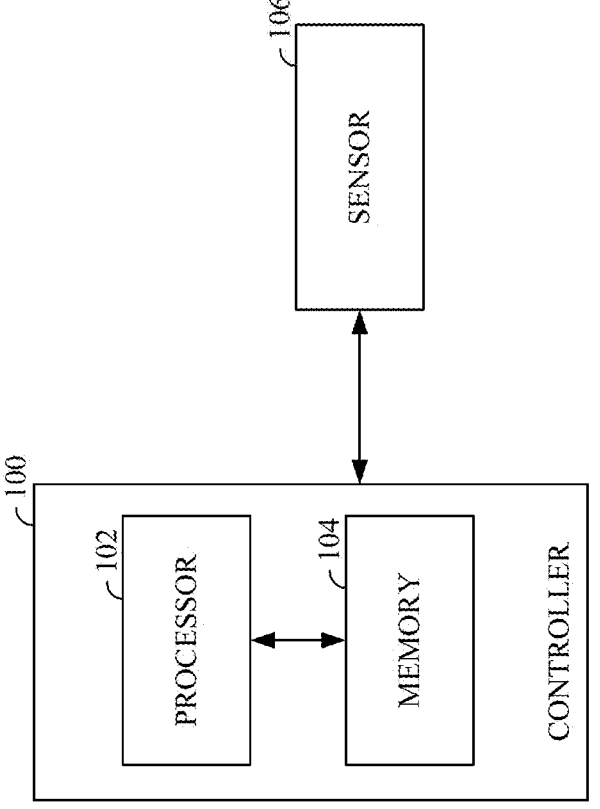
FIG. 1B generally illustrates a controller according to the principles of the present disclosure.

The vehicle 10 includes one or more controllers, such as a controller 100, as is generally illustrated in FIG. 1B. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

As used herein, "controller" may refer to a hardware module or assembly including one or more processors or microcontrollers, memory, sensors, one or more actuators, a communication interface, etc., any portions of which may be collectively referred to as "circuitry." As described herein, respective functions and steps performed by a given controller, control circuitry, etc. may be collectively performed by multiple controllers, processors, etc. For example, a processor, processing device, controller, control circuitry, etc. "configured to perform A and B" may refer to a single processor, processing device, controller, etc. configured to perform both A and B or may refer to a first processor, processing device, controller, etc. configured to perform A and a second processor, processing device, controller, etc. configured to perform B. For simplicity, "control circuitry configured to perform A and B" may refer to a single or multiple processors, processing devices, controllers, etc. collectively configured to perform A and B.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

The controller 100 may be configured to implement open-loop techniques for return-to-center (RtC) functions in SbW and closed-loop EPS systems according to the principles of the present disclosure. For example, controller 100 is configured to implement the techniques described in more detail below in FIGS. 2A, 2B, and 3.

Figure 2A:
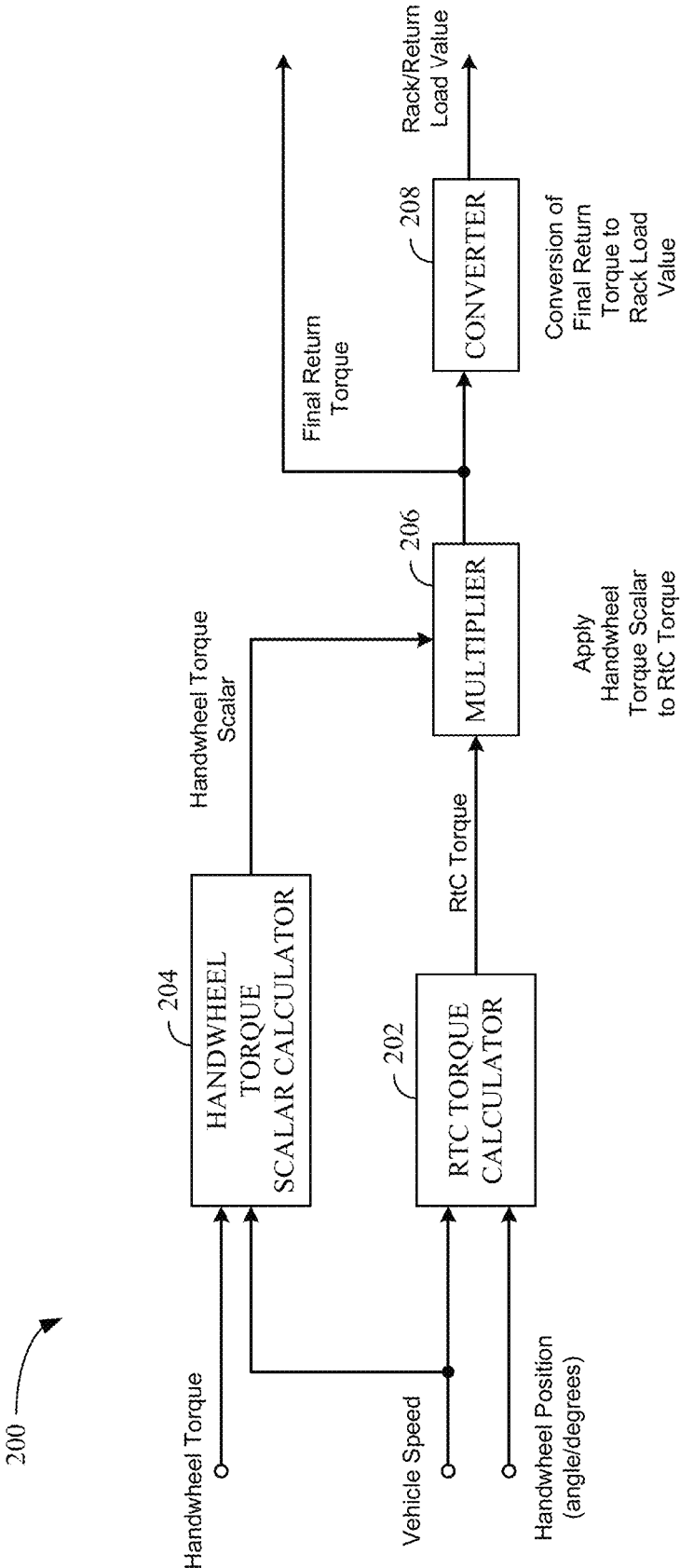
FIGS. 2A and 2B generally illustrate an example return-to-center torque calculation system according to the principles of the present disclosure.
Figure 2B:
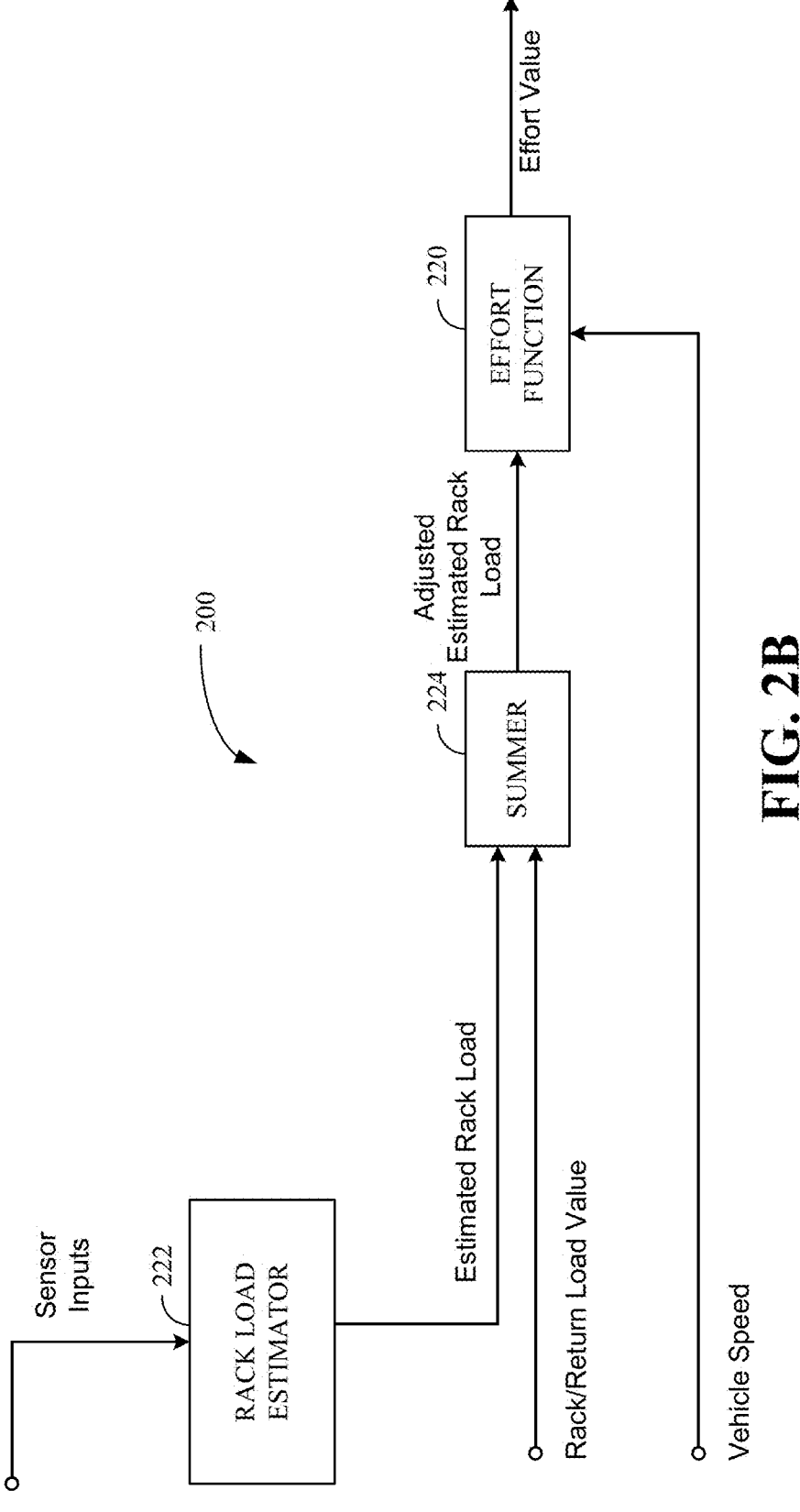

FIGS. 2A and 2B show an example RtC torque calculation system 200 implemented by the controller 100. For example, as shown in FIG. 2A, an RtC torque calculator 202 calculates an RtC torque value (e.g., using a lookup table, calibration table, etc.) based on vehicle speed and steering wheel (i.e., handwheel) position. In an example, the RtC torque calculator 202 includes, accesses, etc. a lookup table that correlates the vehicle speed and handwheel position to RtC torque values.

A handwheel torque scalar calculator 204 receives a handwheel torque (e.g., which corresponds to torque applied by the driver at the handwheel) and calculates a handwheel torque scalar (e.g., using a 2D lookup table that correlates handwheel torque to a scalar/scaling factor) based on the handwheel torque. In some examples, the handwheel torque scalar may be calculated further based on the vehicle speed. For example, the handwheel torque scalar may be derived from a lookup table that correlates the handwheel torque to a scaling factor and may vary with vehicle speed.

The RtC torque value can then be scaled by handwheel torque (e.g., by applying the handwheel torque scalar output by the handwheel torque scalar calculator 204 to the RtC torque output by the RtC torque calculator 202) to improve steering feel when the driver is applying torque to the steering wheel. In an example, as shown, the handwheel torque scalar is applied to the RtC torque using a multiplier 206 to provide the final return torque. For example only, the handwheel torque scalar is a numerical value between 0 and 1 (e.g., a value that increases from 0 to 1, from 0 to 2, etc. as handwheel torque increases (or decreases). In other examples, the handwheel torque scalar is a numerical value in another range, a percentage, etc. In this manner, the RtC torque value may be adjusted (e.g., upward or downward) in according with handwheel torque to improve steering feel.

In some examples, the final return torque can then be converted to a rack load value (e.g., using a scalar value). For example, the final return torque is provided to a converter 208 configured to convert the final (e.g., RtC) return torque to the rack or return ("rack/return") load value by applying a scalar value to the final return torque. In an example, the scalar value may correspond to an instantaneous C-factor of the steering system.

As shown in FIG. 2B, the rack/return load value may be provided to an effort function 220 of a corresponding SbW or closed-loop EPS system. The effort function 220 may output an effort value based on a lookup table or other function (e.g., by using an estimated rack load as an input). The estimated rack load may be modified prior to being input to the lookup table by adding the calculated return load value to the estimated rack load. For example, a rack load estimator 222 may be configured to estimate or calculate the estimated rack load, which is then adjusted prior to being input to the lookup table of the effort function 220 by adding the calculated rack/return load value to the estimated rack load (e.g., at a summer 224). Accordingly, while effort increases correspondingly, RtC speed will increase with hands off (or only lightly on) the steering wheel/handwheel. In an example, the rack load estimator 222 estimates the rack load based on one or more sensor inputs and/or calculated or modeled values (e.g., a rack force deadband value, an understeer rack force estimate, etc.). In some examples, rack load may be measured rather than estimated.

Accordingly, as described above, RtC is calculated and applied as a modification to an existing effort function instead of using a separate closed-loop return function within the SbW or closed-loop EPS logic.

Figure 3:
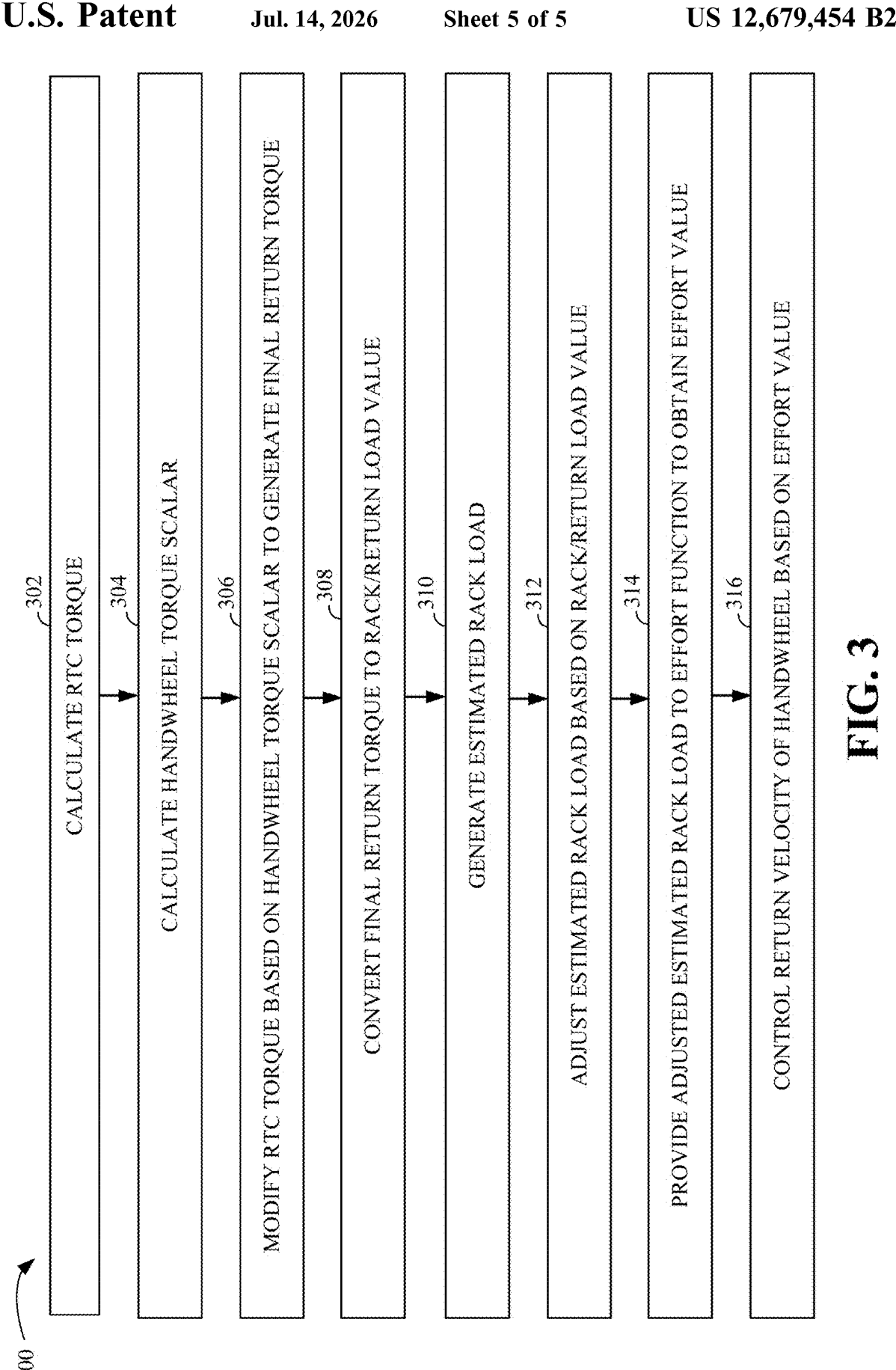
FIG. 3 is a flow diagram generally illustrating steps of an example return-to-center calculation method according to the principles of the present disclosure.

FIG. 3 is a flow diagram generally illustrating steps of an example return-to-center calculation method 300 according to the principles of the present disclosure. For example, the method 300 is implemented by the controller 100 or other circuitry, processors, processing devices, etc. as described above. At 302, the method 300 calculates RtC torque (e.g., based on vehicle speed and handwheel position). At 304, the method 300 calculates a handwheel torque scalar (e.g., based on handwheel torque and, in some examples, vehicle speed. At 306, the method 300 modifies the RtC torque based on the handwheel torque scalar to generate a final return torque. At 308, the method 300 converts the final return torque to a rack/return load value.

At 310, the method 300 generates an estimated rack load. At 312, the method 300 adjusts the estimated rack load based on the rack/return load value to obtain an adjusted estimated rack load. At 314, the method 300 provides the adjusted estimated rack load to an effort function (e.g., of an SbW or EPS system) to obtain an effort value. At 316, the method 300 augments a return velocity of a handwheel based on the effort value.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for augmenting a return velocity of a handwheel coupled to a steering system of a vehicle, the method comprising:
   calculating a return-to-center (RtC) torque for the handwheel based on a vehicle speed and a position of the handwheel;
   calculating a return load value for the handwheel based on the RtC torque;
   adjusting an estimated rack load based on the return load value;
   using an effort function, generating, based on the adjusted estimated rack value, an effort value, wherein the effort function defines a relationship between driver input and a response of the steering system, and wherein the effort value indicates an amount of effort required by the driver to cause a desired response; and
   augmenting, based on the effort value and using the steering system, a return velocity of the handwheel.

2. The method of claim 1, wherein the steering system includes one of a steer-by-wire (SbW) system and a closed-loop electronic power steering (EPS) system.

3. The method of claim 1, further comprising calculating a handwheel torque scalar based on a torque applied to the handwheel and modifying the RtC torque based on the handwheel torque scalar.

4. The method of claim 3, further comprising calculating the handwheel torque scalar further based on the vehicle speed.

5. The method of claim 1, further comprising calculating the return load value by converting the RtC torque to the return load value based on an instantaneous C-factor.

6. A system for augmenting a return velocity of a handwheel coupled to a steering system of a vehicle, the system comprising a processor configured to execute instructions stored in non-transitory computer readable memory, wherein, when executed, the instructions cause the processor to:

calculate return-to-center (RtC) torque for the handwheel based on a vehicle speed and a position of the handwheel;

calculate a return load value for the handwheel based on the RtC torque;

adjust an estimated rack load based on the return load value;

using an effort function, generate, based on the adjusted estimated rack value, an effort value, wherein the effort function defines a relationship between driver input and a response of the steering system, and wherein the effort value indicates an amount of effort required by the driver to cause a desired response; and augment, based on the effort value and using the steering system, a return velocity of the handwheel.

7. The system of claim 6, wherein the steering system includes one of a steer-by-wire (SbW) system and a closed-loop electronic power steering (EPS) system.

8. The system of claim 6, wherein executing the instructions further causes the processor to calculate a handwheel torque scalar based on a torque applied to the handwheel and modify the RtC torque based on the handwheel torque scalar.

9. The system of claim 8, wherein executing the instructions further causes the processor to calculate the handwheel torque scalar further based on the vehicle speed.

10. The system of claim 6, wherein executing the instructions further causes the processor to calculate the return load value by converting the RtC torque to the return load value based on an instantaneous C-factor.

11. A system for augmenting a return velocity of a handwheel coupled to a steering system of a vehicle, the system comprising:

one or more sensors configured to obtain a plurality of values corresponding to one or more steering functions of the vehicle; and a controller configured to calculate return-to-center (RtC) torque for the handwheel based on a vehicle speed and a position of the handwheel, calculate a return load value for the handwheel based on the RtC torque, adjust an estimated rack load based on the return load value, using an effort function, generate, based on the adjusted estimated rack value, an effort value, wherein the effort function defines a relationship between driver input and a response of the steering system, and wherein the effort value indicates an amount of effort required by the driver to cause a desired response, and augment, based on the effort value and using the steering system, a return velocity of the handwheel.

12. The system of claim 11, wherein the steering system includes one of a steer-by-wire (SbW) system and a closed-loop electronic power steering (EPS) system.

13. The system of claim 11, wherein the controller is further configured to calculate a handwheel torque scalar based on a torque applied to the handwheel and modify the RtC torque based on the handwheel torque scalar.

14. The system of claim 13, wherein the controller is further configured to calculate the handwheel torque scalar further based on the vehicle speed.

15. The system of claim 11, wherein the controller is further configured to calculate the return load value by converting the RtC torque to the return load value based on an instantaneous C-factor.

\* \* \* \* \*